(12) United States Patent
Suzuki

(10) Patent No.: US 9,571,269 B2
(45) Date of Patent: Feb. 14, 2017

(54) ENCRYPTION DEVICE, ENCRYPTION METHOD AND PROGRAM

(71) Applicant: NEC Corporation, Minato-ku, Tokyo (JP)

(72) Inventor: Tomoyasu Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/411,595

(22) PCT Filed: Jun. 27, 2013

(86) PCT No.: PCT/JP2013/067652
§ 371 (c)(1),
(2) Date: Dec. 29, 2014

(87) PCT Pub. No.: WO2014/003117
PCT Pub. Date: Jan. 3, 2014

(65) Prior Publication Data
US 2015/0163051 A1   Jun. 11, 2015

(30) Foreign Application Priority Data
Jun. 28, 2012  (JP) ................................ 2012-145470

(51) Int. Cl.
*H04L 12/40* (2006.01)
*H04L 9/06* (2006.01)
*G09C 1/00* (2006.01)

(52) U.S. Cl.
CPC ............. *H04L 9/0618* (2013.01); *G09C 1/00* (2013.01); *H04L 9/0631* (2013.01); *H04L 2209/24* (2013.01)

(58) Field of Classification Search
CPC .................................................. H04L 2463/041
See application file for complete search history.

(56) References Cited

U.S. PATENT DOCUMENTS

| 6,940,975 B1 * | 9/2005 | Kawamura | H04L 9/003 380/29 |
| 2006/0085348 A1 * | 4/2006 | Alda | G06F 21/10 705/52 |

(Continued)

FOREIGN PATENT DOCUMENTS

JP      2004-233427 A    8/2004

OTHER PUBLICATIONS

Federal Information Processing Standards Publication 197, "Announcing the Advanced Encryption Standard (AES)," Nov. 26, 2001.

(Continued)

*Primary Examiner* — Josnel Jeudy

(57) ABSTRACT

A problem to be solved is to reduce processing time when a block cipher which refers to a table is implemented in software.
An encryption device includes: a round-key generation module which generates a round key from a secret key; a table-entry generation module which adds a starting address of an n-bit S-box table (n≥2) aligned to a 2m-bit boundary (m≥n) in a memory, and the round key, and holds an obtained value as a table entry; and a data mixing module which mixes data by referring to the S-box stored in the first memory, by using, as a table index, an exclusive OR between the table entry stored in the second memory and the data.

12 Claims, 7 Drawing Sheets

(56) References Cited

U.S. PATENT DOCUMENTS

| | | | |
|---|---|---|---|
| 2007/0286413 A1 | 12/2007 | Derouet | |
| 2008/0019524 A1* | 1/2008 | Kim | H04L 9/0631 380/259 |
| 2009/0168999 A1* | 7/2009 | Boswell | H04L 9/0631 380/44 |
| 2010/0115286 A1* | 5/2010 | Hawkes | G06F 12/1408 713/189 |
| 2014/0161253 A1* | 6/2014 | Dumchin | G09C 1/00 380/44 |

OTHER PUBLICATIONS

Junko Nakajima and Mitsuru Matsui, "Performance Evaluation of Block Encryption Algorithms," Mitsubishi Electric Technical Report, May 25, 2008, vol. 82, No. 5, pp. 27-30.
Seiichi Amada, Takeshi Shimoyama, and Shiho Moriai, "Improvement of Fast Software Implementation of Block Ciphers: A New Algorithm Which Reduces the Number of Instructions in Functions used in Block Ciphers," Technical Report of IEICE, May 26, 1997, vol. 97, No. 71, pp. 107-119. English Abstract.
International Search Report for PCT Application No. PCT/JP2013/067652, mailed on Jul. 30, 2013.
Japanese Office Action for JP Application No. 2014-522679 mailed on Sep. 20, 2016 with English Translation.

* cited by examiner

ROUND-KEY GENERATION MODULE 13

ENCRYPTION DEVICE, ENCRYPTION METHOD AND PROGRAM

This application is a National Stage Entry of PCT/JP2013/067652 filed on Jun. 27, 2013, which claims priority from Japanese Patent Application 2012-145470 filed on Jun. 28, 2012, the contents of all of which are incorporated herein by reference, in their entirety.

TECHNICAL FIELD

Description of Related Application

The present invention is based on Japanese Patent Application No. 2012-145470 (filed on Jun. 28, 2012), the entire contents of which are incorporated herein by reference.

The present invention relates to an encryption device, an encryption method and a program, and especially to an encryption device, an encryption method and a program which are based on a common-key block cipher for ensuring the confidentiality of data in data communication and data storing.

Background Art

A block cipher is known as a technique for ensuring the confidentiality of communication data, storing data. Representative block cipher algorithms are DES (Data Encryption Standard) and AES (Advanced Encryption Standard) described in Non Patent Literature 1, and the like.

FIG. 7 is a block diagram illustrating an example of a configuration of an encryption device 110 which encrypts a plaintext into a ciphertext based on a block cipher. Referring to FIG. 7, the cipher device 110 includes a key scheduling unit 111 and a data mixing module 112.

The key scheduling unit 111 generates a round key from a secret key (cipher key). In the case of implementing the encryption device 110 as software implemented on a computer, the generated round key is stored in a memory. The data mixing module 112 generates a ciphertext by mixing a plaintext and the round key.

The flow of an encryption process is as follows. The key scheduling unit 111 operates, at the time when a program is started to run or at the time of a process for cipher-key update, to thereby generate a round key from a secret key. The data mixing module 112 performs an operation the number of times corresponding to the length of the plaintext during the encryption process.

Many block ciphers use a substitution table called an S-box. The S-box is an element which performs nonlinear operations, and is a component which forms the basis for security. The cryptographic security required for the S-box includes differential probability, linear probability, Boolean algebra order, and the number of terms in an interpolation polynomial, and the like. As a method of designing the S-box which has excellent characteristics in these respects, a method combining a power operation on a Galois field and affine transformation is known. However, this method has a problem that processing takes time due to a great amount of operation. As measures against this problem, an implementation method in which operation results obtained in advance are stored in a table is employed. In an encryption process, a desired operation result can be obtained by referring to the table by using corresponding data before the operation as a table index.

The S-box used in AES will be described as an example. The S-box in AES takes an 8-bit value (1 byte), and outputs a value in the range of 256. When the data before the operation is 0x00, the operation result is 0x63; when the data is 0x01, the result is 0x7C; when the data is 0x02, the result is 0x77; . . . ; and when the data is 0xFF, the operation result is 0x16 (FIG. 7 in NPL 1). In this case, a table S, which stores the operation results of the S-box, is defined by Equation 1.

$$S[256]=\{0\times63, 0\times7C, 0\times77, \ldots, 0\times16\} \quad \text{[Equation 1]}$$

In general, key data (round key) is applied to data before operation by the S-box. As an operation for applying the key data to the data, exclusive OR referred to as "XOR" below) is used. Assume that data before an operation is denoted by x, key data is denoted by k and data after the operation is denoted by y, the procedure for S-box reference is expressed as in Equation 2 when described in the manner of the C language.

$$y=S[x@k] \quad \text{[Equation 2]}$$

In Equation 2, @ is a symbol denoting XOR. Key data k is generated from a secret key by the key scheduling unit 111.

Moreover, a process of S-box reference is expressed as in Equation 3 when described in assembly-level pseudocodes.

$$\begin{aligned}&\text{LOAD } r2,[r4] \\ &\text{XOR } r1,r2 \\ &\text{ADD } r1,r3 \\ &\text{LOAD } r2,[r1]\end{aligned} \quad \text{[Equation 3]}$$

In Equation 3, r1 to r4 denote registers. It is assumed that data x is assigned to the register r1, the starting address of the table S is assigned to the register 3, and the address of the round key k is assigned to the register r4.

Referring to Equation 3, first, the key data k is loaded into the register r2 by the first LOAD instruction. Then, by the XOR instruction, x@k, which is an XOR between the data x and the key data k, is calculated, and the result is assigned to the register r1. Subsequently, by the ADD instruction, (x@k) is added to the starting address of the table S, and the result is stored in the register r1. As a result of this addition, the address where the operation result is stored is obtained. Then, by the second LOAD instruction, the operation result stored in the address r1 is loaded into the register r2.

As described above, for S-box reference, a series of four instructions presented in Equation 3 needs to be executed.

CITATION LIST

Non Patent Literature

[NPL 1] Federal Information Processing Standards Publication 197, "Announcing the ADVANCED ENCRYPTION STANDARD (AES)," Nov. 26, 2001.

SUMMARY OF INVENTION

Technical Problem

The following analysis was made by the inventor of the present invention.

Microcomputers (especially inexpensive microcomputers) used in integral systems are often poorer in function than processors used in personal computers and servers. For example, in high-function processors, functions such as instruction pipeline and out-of-order execution optimize the execution order of instructions, to thereby reduce processing time. However, many low-function microcomputers do not have these functions. Accordingly, to implement an encryption algorithm in software on a microcomputer, the number of instructions needs to be reduced.

In view of this, a problem to be solved is to reduce processing time when a block cipher which refers to a table is implemented in software. An object of the present invention is to provide an encryption device, an encryption method and a program which solve this problem.

Solution to Problem

An encryption device according to a first aspect of the present invention includes: a round-key generation module which generates a round key from a secret key; a table-entry generation module which adds a starting address of an n-bit S-box table (n≥2) aligned to a $2^m$-bit boundary (m≥n) in a memory, and the round key, and holds an obtained value as a table entry; and a data mixing module which mixes data by referring to the S-box stored in the memory, by using, as a table index, an exclusive OR between the table entry and the data.

An encryption method according to a second aspect of the present invention includes the steps in which a computer: generates a round key from a secret key; adds a starting address of an n-bit S-box table (n≥2) aligned to a 2m-bit boundary (m≥n) in a memory, and the round key, and holds an obtained value as a table entry; and mixes data by referring to the S-box stored in the first memory, by using, as a table index, an exclusive OR between the table entry stored in the second memory and the data.

A program according to a third aspect of the present invention causes a computer to execute: a processing of generating a round key from a secret key; a processing of adding a starting address of an n-bit S-box table (n≥2) aligned to a $2^m$-bit boundary (m≥n) in a memory, and the round key, and holding an obtained value as a table entry; and a processing of mixing data by referring to the S-box stored in the first memory, by using, as a table index, an exclusive OR between the table entry stored in the second memory and the data.

Note that the program can be provided as a program product stored in a computer-readable storage medium (non-transitory computer-readable storage medium).

Advantageous Effects of Invention

With the encryption device, the encryption method and the program according to the present invention, it is possible to reduce processing time when a block cypher which refers to a table is implemented in software.

DESCRIPTION OF EMBODIMENTS

Figure 1:
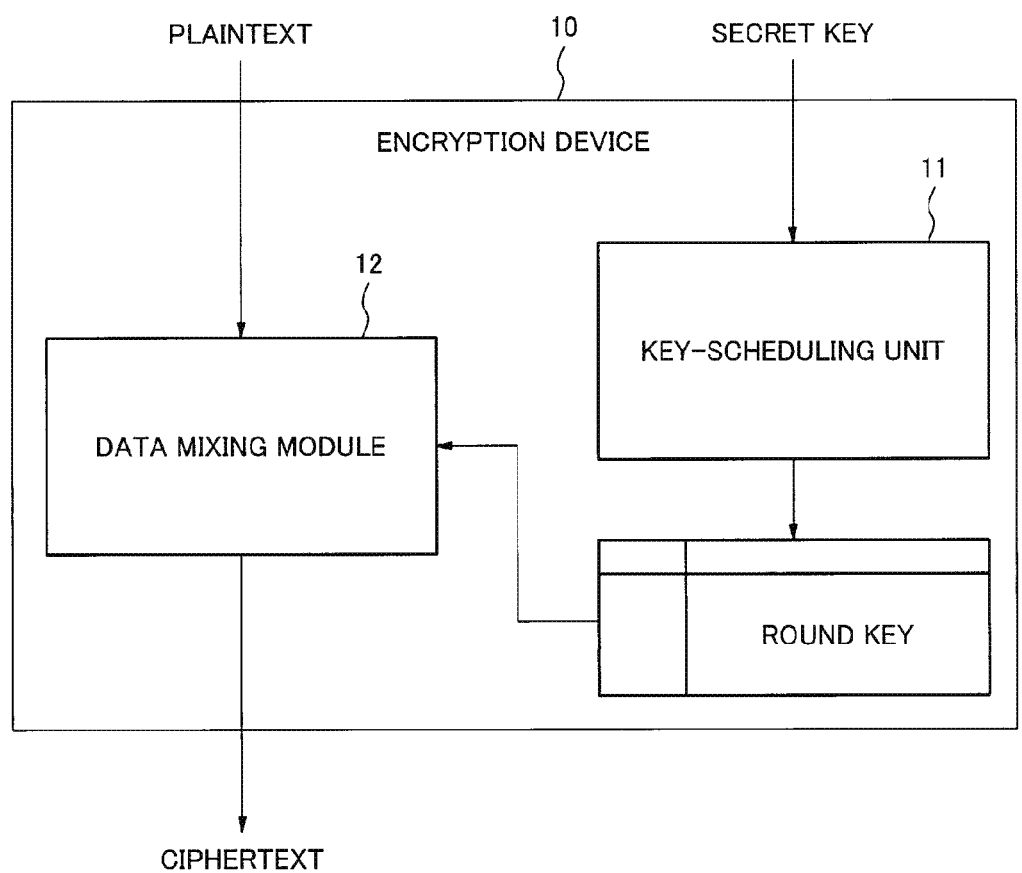
FIG. 1 is a block diagram illustrating an example of a configuration of an encryption device according to a first exemplary embodiment.

First, the overview of an encryption device of an exemplary embodiment will be described. Note that drawing reference numerals in the overview are provided merely for illustrative purposes to help understanding, and are not intended to limit the present invention to the modes illustrated in the drawings.

Figure 2:
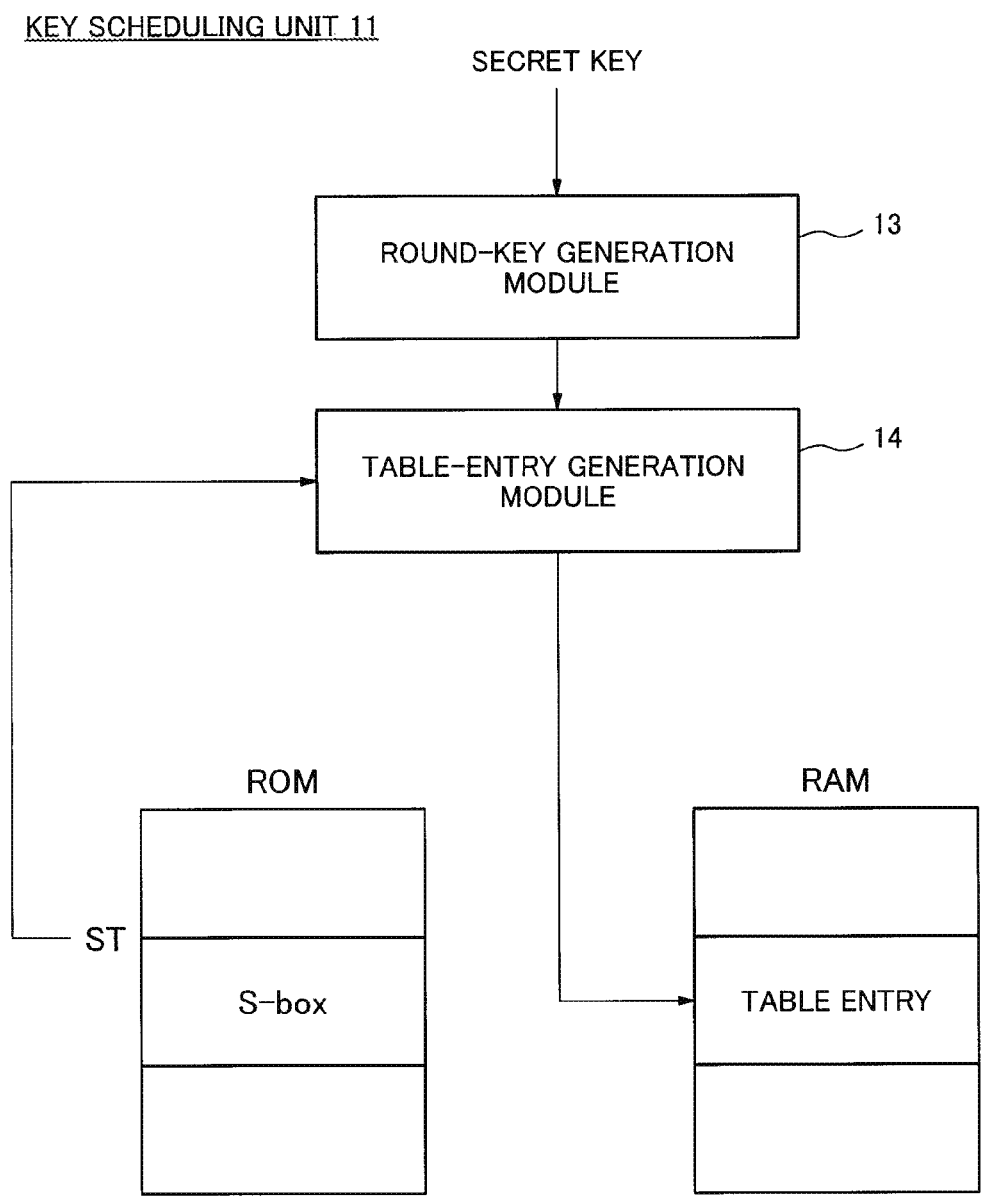
FIG. 2 is a block diagram illustrating an example of a configuration of a key scheduling unit in the encryption device according to the first exemplary embodiment.

FIG. 1 is a block diagram illustrating an example of a configuration of an encryption device (10) according to the present invention. Referring to FIG. 1, the encryption device (10) includes a key scheduling unit (11) and a data mixing module (12). FIG. 2 is a block diagram illustrating an example of a detailed configuration of the key scheduling unit (11). Referring to FIG. 2, the key scheduling unit (11) includes a round-key generation module (13) and a table-entry generation module (14).

The round-key generation module (13) generates a round key from a secret key. The table-entry generation module (14) adds a starting address (ST) of an n-bit S-box table (n≥2) aligned to the $2^m$-bit boundary (m≥n) of a memory, and the round key, and then holds the obtained value as a table entry. The data mixing module (12) refers to the S-box stored in the memory by using, as a table index, the exclusive OR between the table entry and data, and thereby mixes data.

Description will be given of a case where an S-box table is aligned to a 2m-bit boundary (m≥n) in a first memory (e.g., ROM), as illustrated in FIG. 2. In this case, the table-entry generation module (14) may add the starting address (ST) of the S-box table in the first memory (ROM), and the round key, and then store the obtained value as a table entry in a second memory (e.g., RAM). Such being the case, the data mixing module (12) mixes the data by referring to the S-box stored in the first memory (ROM) by using, as a table index, the exclusive OR between the table entry stored in the second memory (RAM) and the data.

Figure 6:
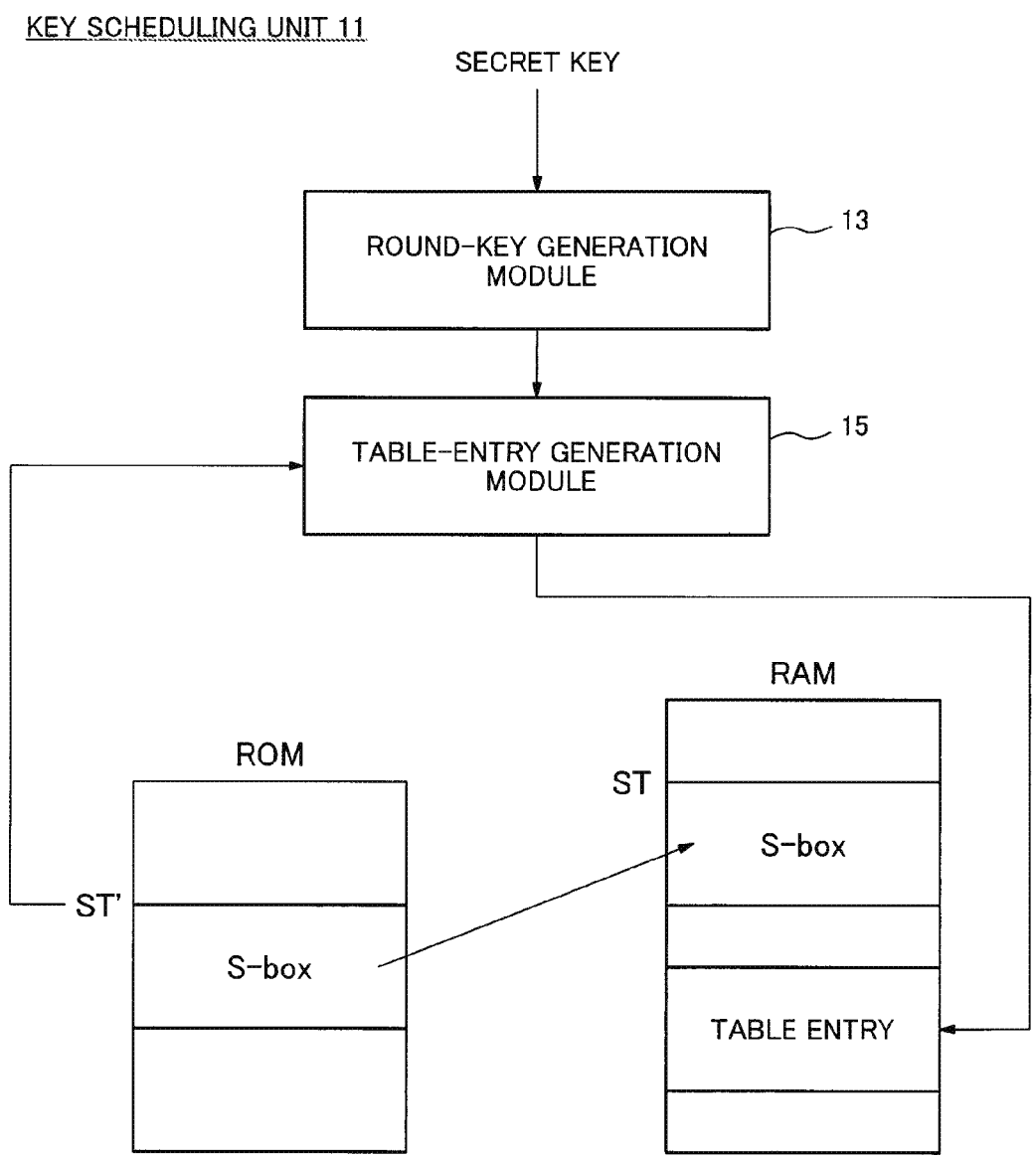
FIG. 6 is a block diagram illustrating an example of a configuration of a key scheduling unit in an encryption device according to a second exemplary embodiment.
Figure 7:
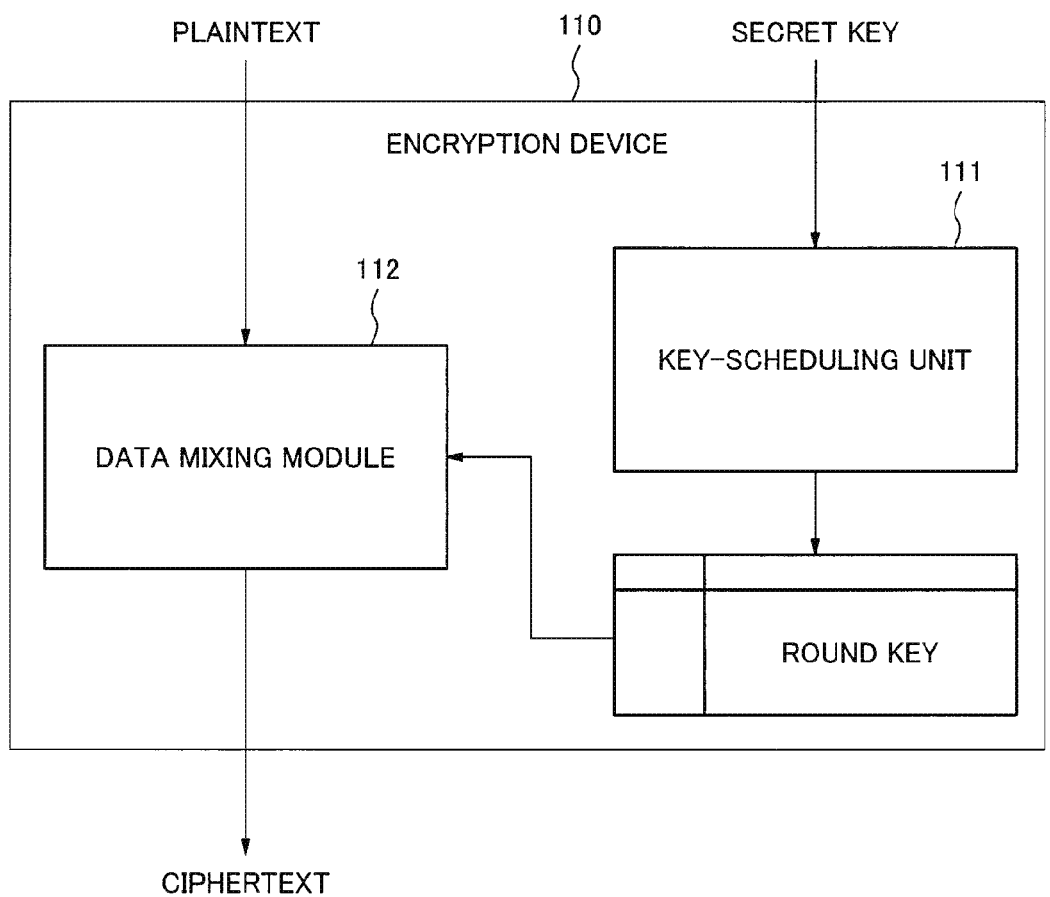
FIG. 7 is a block diagram illustrating a basic configuration of a block cipher.

As a different example, a case, as illustrated in FIG. 6, where the S-box table is not aligned to the $2^m$-bit boundary (m≥n) of the first memory (e.g., ROM) will be described. In this case, a table entry generation module (15) may copy the S-box table to the $2^m$-bit boundary (m≥n) in the second memory (e.g., RAM), add the starting address (ST) of the S-box table in the second memory (RAM), and the round key. Then, the table entry generation module (15) may store the obtained value as a table entry in the second memory (e.g., RAM). Such being the case, the data mixing module (12) mixes the data by referring to the S-box table stored in the second memory (RAM) by using, as a table index, the exclusive OR between the table entry stored in the second memory (RAM) and the data.

As described above, by adding the address of the table and the key data in advance, it is possible to reduce the number of instructions required for the data mixing module (12) to refer to the S-box table. Given that the value obtained by adding the address of the S-box table and key data k is denoted by k', the process of referring to the S-box table is expressed by Equation 4 when described in assembly-level pseudocodes. It is assumed here that the address of data x is assigned to a register r1, and the address of key data k' is assigned to a register r4.

LOAD $r2, [r4]$

XOR $r1, r2$

LOAD $r2, [r1]$     [Equation 4]

From Equation 4, it can be understand that the ADD instruction in Equation 3 is reduced. During a single execution of the encryption process, reference to the S-box table is made a multiple number of times. For example, in the case of AES-128, reference to the S-box table is made 160 times during a single execution of the encryption process. This means that, by reducing one instruction per reference to the S-box table, 160 instructions can be reduced in a single execution of the encryption process. Hence, the encryption device (10) according to the present invention can significantly reduce processing time when a block cipher which refers to a table is implemented in software.

In general, the value obtained by an operation of A+(B@C) with data A, B, and C is different from the value obtained by an operation of (A+B)@C, having a different operation order in terms of addition and XOR. This is because an addition instruction may produce a carry from a lower bit to an upper bit. Assume that the data width of the data A is denoted by nA and the data width of the data B and C is denoted by n ($n_A$>n). When the starting address of the S-box table S is aligned to the $2^m$-bit boundary ($n_A$>m>n), the lower m bits of the starting address of the table S are 0. In this case, no carry is produced at m+1-th bit or higher by adding any value to the lower m bits. In this case, the operation of (A+B)@C generates the same results as that obtained by the operation of A+(B@C). Hence, when reference to the S-box table is made in the process according to Equation 4, the same result as that when reference to the S-box is made in the process according to Equation 3 is obtained.

(First Exemplary Embodiment)

An encryption device according to a first exemplary embodiment will be described in detail with reference to the drawings. FIG. 1 is a block diagram illustrating an example of a configuration of an encryption device 10 according to this embodiment. Referring to FIG. 1, the encryption device 10 includes a key scheduling unit 11 and a data mixing module 12.

FIG. 2 is a block diagram illustrating an example of a detailed configuration of the key scheduling unit 11. Referring to FIG. 2, the key scheduling unit 11 includes a round-key generation module 13 and a table-entry generation module 14.

The round-key generation module 13 is implemented according to a scheme defined by a cipher algorithm, and generates a round key from a secret key. The table-entry generation module 14 generates a table entry from a starting address ST of an S-box table aligned in a ROM and the round key generated by the round-key generation module 13, and then stores the table entry in a RAM (Random Access Memory).

Figure 3:
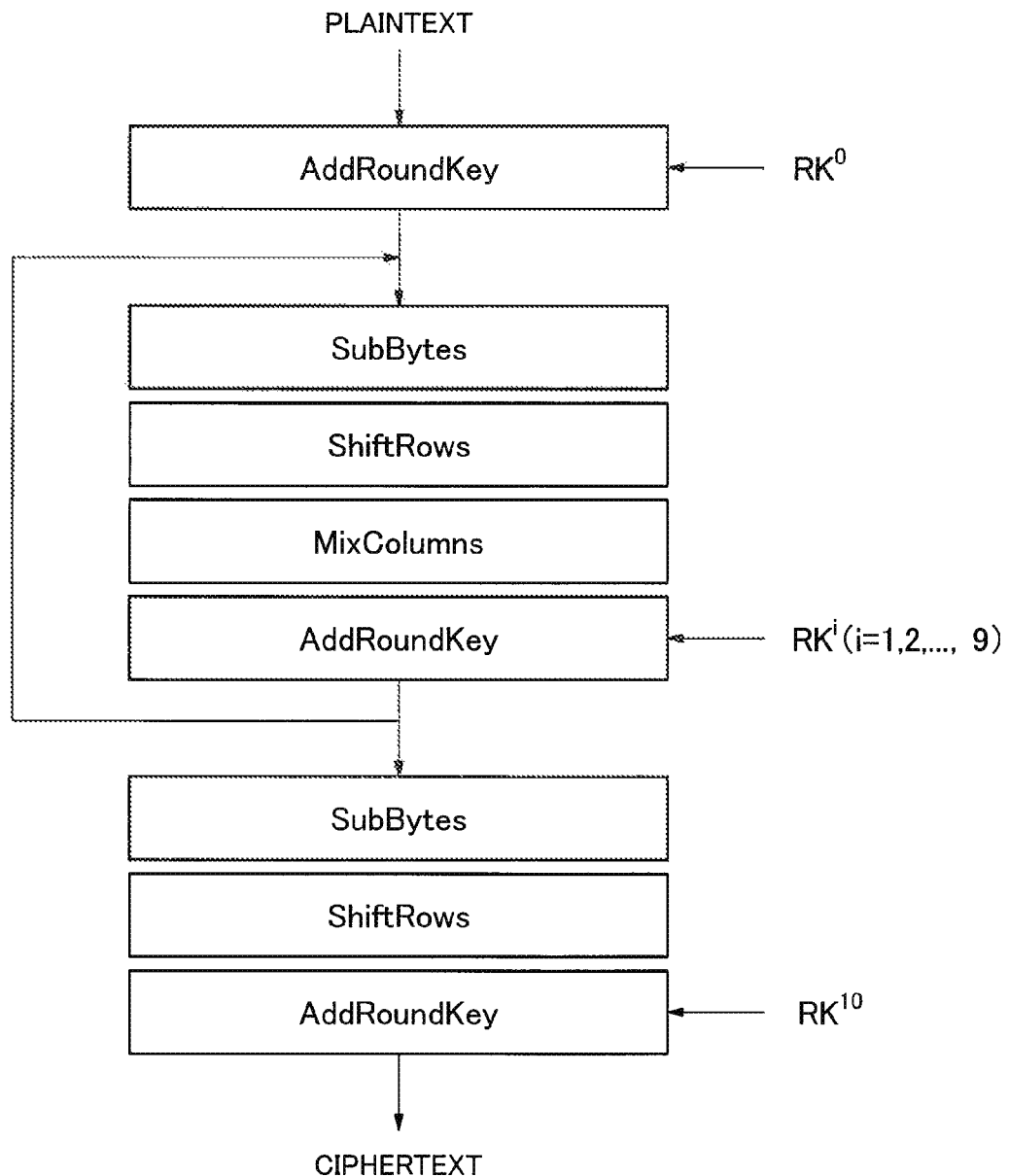
FIG. 3 is a flowchart presenting operations in an encryption process based on AES-128.

In the following, operations of the encryption device 10 of this embodiment will be described in detail by using a concrete cipher algorithm. The description will be given below by taking AES-128 (Non Patent Literature 1) as an example of the cipher algorithm. FIG. 3 illustrates an encryption process according to AES-128. In AddRoundKey, an exclusive OR is performed between 128-bit data and a 128-bit round key $RK_i$ (0≤i≤10). In SubBytes, the 128-bit data is divided into sixteen 8-bit data, and a substitution by the S-box is performed on each 8-bit data. ShiftRows is an 8-bit-based data transpose process. In MixColumns, an operation using MDS (Maximum Distance Separable) matrix is performed on 8-bit×4 data. The details of the algorithm are described in Non Patent Literature 1.

Figure 4:
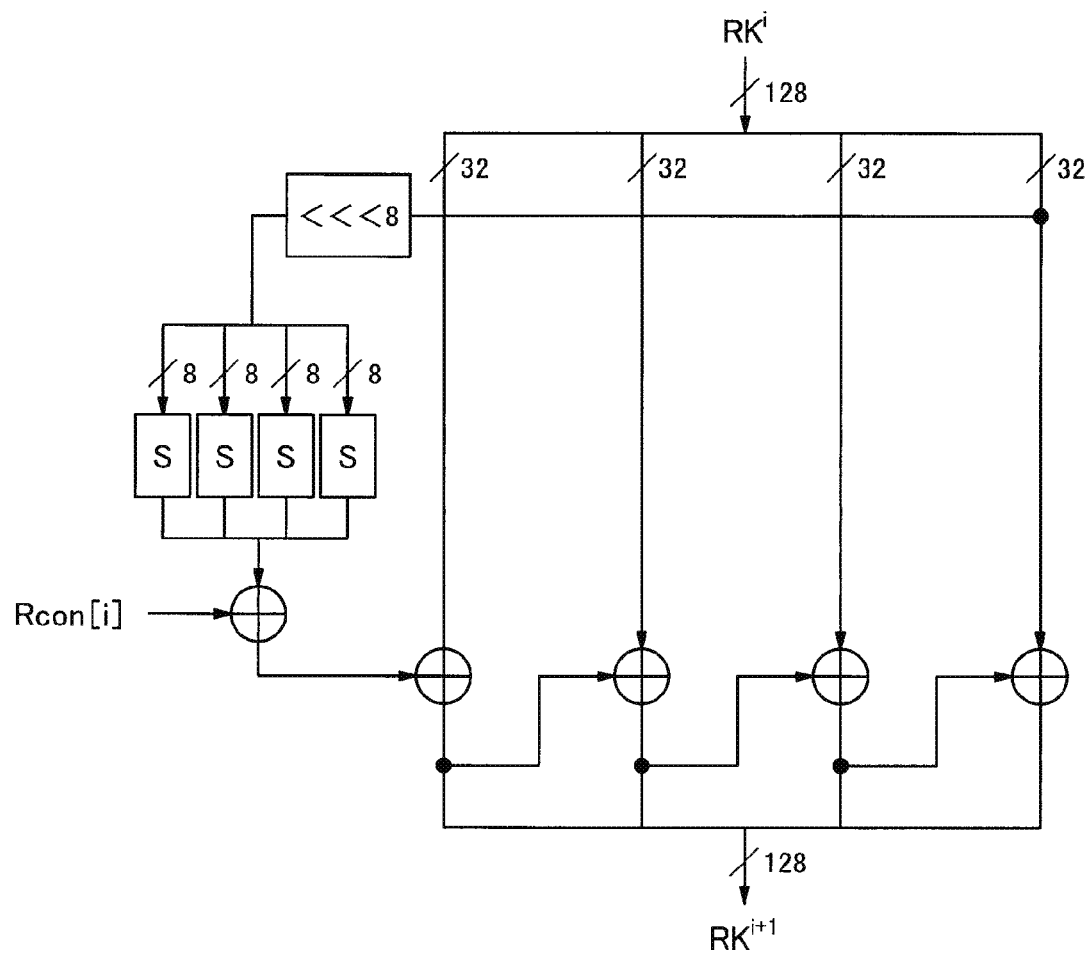
FIG. 4 is a block diagram illustrating a configuration of a round-key generation module based on AES-128.

FIG. 4 illustrates a configuration of the round-key generation module 13 using AES-128. FIG. 4 presents a procedure for generating a round key RKi+1 from the round key $RK_i$ (0≤i≤9). A 128-bit secret key is set as $RK_0$.

The round-key generation module 13 inputs round keys $RK_0$ to $RK_{10}$ to the table-entry generation module 14. As a passing method, the round-key generation module 13 may generate all the round keys $RK_0$ to $RK_{10}$ first and then store the round keys $RK_0$ to $RK_{10}$ in a memory via the table-entry generation module 14. Alternatively, the round-key generation module 13 may pass, every time generating the round key $RK_i$, the round key $RK_i$ to the table-entry generation module 14. The table-entry generation module 14 also receives the starting address ST of the S-box to be referred to in SubBytes.

Since the S-box based on AES takes an 8-bit input and generates an 8-bit output, the start of the S-box is assumed to be aligned to the $2^m$-bit boundary (m≥8). In other words, the lower m bits of the starting address ST are 0. Note that the length of the entire address ST is m+1 bits or larger.

Figure 5:
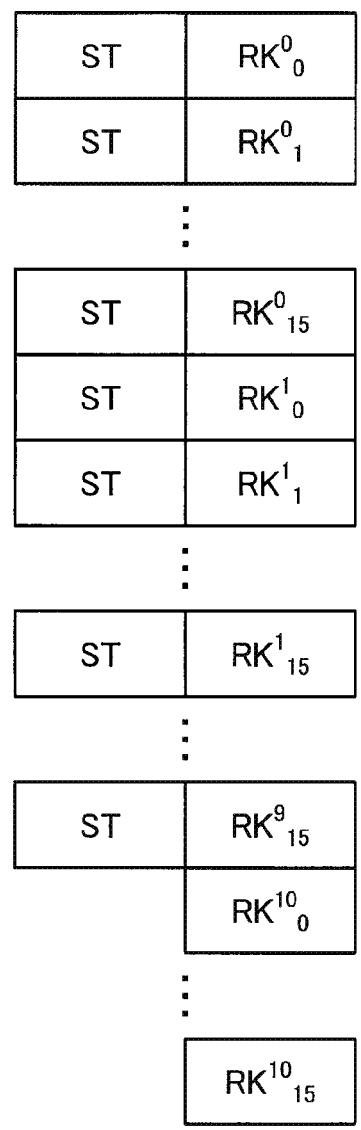
FIG. 5 is a diagram illustrating table entries in a RAM.

The table-entry generation module 14 divides each round key $RK_i$ (0≤i≤9) into 8-bit round keys. Each obtained 8-bit round key is denoted by $RK_{ij}$ (0≤j≤15). The table entry generation module 14 adds $RK_{ij}$ and the starting address ST, to thereby generate a table entry (see FIG. 5). The generated table entry is stored in the RAM. Since no SubBytes is included after AddRoundKey for $RK_{10}$, $RK_{10}$ is simply stored without performing addition of the starting address ST.

The processes of AddRoundKey and SubBytes in the encryption process are performed according to the instructions presented in Equation 4. By the first LOAD instruction, each table entry is loaded. Then, by calculating XOR between the table entry and the data, the calculation of the address where a corresponding operation result of the S-box is stored is completed.

The encryption device 10 of this embodiment aligns the starting address of the n-bit S-box table referred to by the data mixing module 12, to the 2m-bit boundary (m≥n) in the ROM. Then, the key scheduling unit 11 stores the value obtained by converting the starting address to the generated round key, in the RAM as a table entry. The data mixing module 12 loads data by using, as an address, the value obtained by adding the data to the table entry.

The encryption device 10 of First exemplary embodiment refers to the S-box table according to Equation 4, which can reduce the number of instructions compared to the case of referring to the S-box table according to Equation 3. Hence, with the encryption device 10, it is possible to significantly reduce processing time when a block cipher which refers to a table is implemented in software.

(Second Exemplary Embodiment)

An encryption device according to a second exemplary embodiment will be described in detail with reference to the drawings. The encryption device according to this embodiment includes a key scheduling unit 11 and a data mixing module 12 as in the configuration of the encryption device 10 (FIG. 1) according to the first exemplary embodiment.

FIG. 6 is a block diagram illustrating an example of a detailed configuration of the key scheduling unit 11 of the encryption device of this embodiment. Referring to FIG. 6, the key scheduling unit 11 includes a round-key generation module 13 and a table-entry generation module 15.

Referring to FIG. 6, in this embodiment, an S-box table is aligned to the $2_p$-bit boundary (p<m) in a ROM (Read Only Memory). In this case, the table-entry generation module 15 copies the S-box table in the ROM to the $2^m$-bit boundary in a RAM. Then, the table-entry generation module 15 generates a table entry from a starting address ST of the S-box table copied to the RAM and a round key generated by the round-key generation module 13, and stores the generated table entry in the RAM.

The encryption device of the Second exemplary embodiment, as the encryption device of the first exemplary embodiment, refers to the S-box table according to Equation 4, which can reduce the number of instructions compared to the case of referring to the S-box table according to Equation 3. Hence, with this encryption device, it is possible to significantly reduce processing time when a block cipher which refers to a table is implemented in software.

The encryption device according to the present invention can be applied to the use for ensuring the confidentiality of communication data of a voice communication terminal, a data communication device, or the like, and encrypting data stored in a storage.

The disclosure of the prior art document in the above-given patent document is incorporated herein by reference. Changes and adjustments can be made to the embodiments within the scope of the entire disclosure (including the scope of claims) of the present invention on the basis of the fundamental technical ideas thereof. In addition, a variety of combinations or selections of various disclosed components (including the components in the claims, the components in the embodiments, the components in the drawings, and the like) are possible within the scope of claims of the present invention. In other words, the present invention naturally includes various alternations and modifications which those skilled in the art can make according to the entire disclosure including the scope of claims and the technical ideas. Especially as to the numerical range mentioned in this application, it should be understood that any numeric value within the range or a smaller range thereof is intended to be concretely described even when the value or the range is not particularly mentioned.

REFERENCE SIGNS LIST

10, 110 Encryption device
11, 111 Key scheduling unit
12, 112 Data mixing module
13 Round-key generation module
14, 15 Table-entry generation module

What is claimed is:

1. An encryption device comprising:
a memory storing instructions; and
at least one processor configured to process the instructions to:
generate a round key from a secret key;
add a starting address of an n-bit S-box table (n≥2) aligned to a $2^m$-bit boundary (m≥n) in a memory, and the round key, and holds an obtained value as a table entry; and
mix data by referring to the S-box stored in the memory by using, as a table index, an exclusive OR between the table entry and the data,
wherein generating the round key from the secret key, adding the starting address of the n-bit S-box table aligned to the $2^m$-bit boundary in the memory, and mixing the data by referring to the S-box stored in the memory by using the exclusive OR reduces a number of S-box reference instructions performed, thereby improving performance functioning of the encryption device in reading key data.

2. The encryption device according to claim 1, wherein the processor is further configured to:

when the S-box table is aligned to a $2^m$-bit boundary (m≥n) of a first memory, in the adding the starting address add a starting address of the S-box table in the first memory, and the round key, and store an obtained value as a table entry in a second memory, and in the data mixing, mix data by referring to the S-box stored in the first memory by using, as a table index, an exclusive OR between the table entry stored in the second memory and the data.

3. The encryption device according to claim 1, wherein the processor is further configured to:

when the S-box table is not aligned to a $2^m$-bit boundary (m≥n) in a first memory, in the adding the starting address, copy the S-box table to a $2^m$-bit boundary (m≥n) in a second memory, add a starting address of the S-box table in the second memory and the round key, and store an obtained value as a table entry in a second memory, and in the data missing, mix data by referring to the S-box stored in the first memory by using, as a table index, an exclusive OR between the table entry stored in the second memory and the data.

4. The encryption device according to claim 1, wherein the processor is further configured to:

in the data mixing, mix the data according to an AES (Advanced Encryption Standard) algorithm.

5. An encryption method comprising:

generating, by a computer, a round key from a secret key;

dding, by the processor, a starting address of an n-bit S-box table (n≥2) aligned to a $2^m$-bit boundary (m≥n) in a memory, and the round key, and holds an obtained value as a table entry; and mixing, by the processor, data by referring to the S-box stored in the first memory, by using, as a table index, an exclusive OR between the table entry stored in the second memory and the data, wherein generating the round key from the secret key, adding the starting address of the n-bit S-box table aligned to the $2^m$-bit boundary in the memory, and mixing the data by referring to the S-box stored in the memory by using the exclusive OR reduces a number of S-box reference instructions performed, thereby improving performance functioning of the processing in reading key data.

6. The encryption method according to claim 5, wherein, the computer adds, when the S-box table is aligned to a $2^m$-bit boundary (m≥n) of a first memory, a starting address of the S-box in the first memory, and the round key, and stores an obtained value as a table entry in a second memory, and mixes data by referring to the S-box stored in the first memory, by using, as a table index, an exclusive OR between the table entry stored in the second memory and the data.

7. The encryption method according to claim 5, wherein, the computer copies, when the S-box table is not aligned to a $2^m$-bit boundary (m≥n) in a first memory, the S-box table to a $2^m$-bit boundary (m≥n) in a second memory, adds a starting address of the S-box table in the second memory and the round key, and stores an obtained value as a table entry in a second memory, and mixes data by referring to the S-box stored in the first memory, by using, as a table index, an exclusive OR between the table entry stored in the second memory and the data.

8. The encryption method according to claim 5, wherein the computer mixes the data according to an AES (Advanced Encryption Standard) algorithm.

9. A non-transitory computer readable medium that stores therein a program causing a computer to execute:
- a processing of generating a round key from a secret key;
- a processing of adding a starting address of an n-bit S-box table (n≥2) aligned to a $2^m$-bit boundary (m≥n) in a memory, and the round key, and holding an obtained value as a table entry; and
- a processing of mixing data by referring to the S-box stored in the first memory, by using, as a table index, an exclusive OR between the table entry stored in the second memory and the data,
- wherein generating the round key from the secret key, adding the starting address of the n-bit S-box table aligned to the $2^m$-bit boundary in the memory, and mixing the data by referring to the S-box stored in the memory by using the exclusive OR reduces a number of S-box reference instructions performed, thereby improving performance functioning of the computer in reading key data.

10. The non-transitory computer readable medium according to claim 9, causing the computer to execute a processing of,
- when the S-box table is aligned to a $2^m$-bit boundary (m≥n) of a first memory, adding a starting address of the S-box in the first memory, and the round key, and storing an obtained value as a table entry in a second memory, and
- mixing data by referring to the S-box stored in the first memory, by using, as a table index, an exclusive OR between the table entry stored in the second memory and the data.

11. The non-transitory computer readable medium according to claim 9, causing the computer to execute a processing of,
- when the S-box table is not aligned to a $2^m$-bit boundary (m≥n) in a first memory, copying the S-box table to a $2^m$-bit boundary (m≥n) in a second memory, adding a starting address of the S-box table in the second memory, and the round key, and storing an obtained value as a table entry in a second memory, and
- mixing data by referring to the S-box stored in the first memory, by using, as a table index, an exclusive OR between the table entry stored in the second memory and the data.

12. The non-transitory computer readable medium according to claims 9, causing the computer to execute a processing of mixing the data according to an AES (Advanced Encryption Standard) algorithm.

* * * * *